United States Patent
Fujii

(10) Patent No.: US 7,024,118 B2
(45) Date of Patent: Apr. 4, 2006

(54) OPTICAL TIME-DIVISION MULTIPLEXER USING OPTICAL FIBER FOR PHASE ADJUSTMENT

(75) Inventor: Kozo Fujii, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 676 days.

(21) Appl. No.: 10/098,292

(22) Filed: Mar. 18, 2002

(65) Prior Publication Data

US 2003/0035174 A1    Feb. 20, 2003

(30) Foreign Application Priority Data

Aug. 20, 2001    (JP) .............................. 2001-248788

(51) Int. Cl.
*H04J 14/08*    (2006.01)
*H04J 14/00*    (2006.01)

(52) U.S. Cl. .............................. 398/98; 398/52; 398/75

(58) Field of Classification Search .................. 398/53, 398/98–103, 118–131; 385/1–3, 13, 25, 385/31, 43

See application file for complete search history.

(56) References Cited

U.S. PATENT DOCUMENTS

| 5,471,332 | A | * | 11/1995 | Shiragaki et al. ............. 398/45 |
| 5,917,628 | A | * | 6/1999 | Ooi et al. ..................... 398/98 |
| 6,005,995 | A | * | 12/1999 | Chen et al. .................... 385/24 |
| 6,215,941 | B1 | * | 4/2001 | Nagai et al. ................. 385/136 |
| 2002/0003641 | A1 | * | 1/2002 | Hall et al. .................. 359/122 |

\* cited by examiner

*Primary Examiner*—M. R. Sedighian
(74) *Attorney, Agent, or Firm*—Venable LLP; Michael A. Sartori

(57) ABSTRACT

An optical time-division multiplexer branches input light into a plurality of optical paths with different optical lengths. At least one path includes a section of optical fiber with an optical length that is adjustable by physical stretching. The input light is separately modulated on each optical path, and the modulated light signals are recombined into a multiplexed output light signal. Adjustment of the optical length of the optical fiber can compensate for changes in input wavelength and adjust the phase of successive pulses in the multiplexed output signal to provide a π-radian shift that enables long-haul optical transmission.

10 Claims, 1 Drawing Sheet

OPTICAL TIME-DIVISION MULTIPLEXER USING OPTICAL FIBER FOR PHASE ADJUSTMENT

BACKGROUND OF THE INVENTION

1. Field of the Invention

The present invention relates to an optical time-division multiplexer for use in optical transmission apparatus.

2. Description of the Related Art

An optical multiplexer module (OMUX module) having a plurality of optical paths with different optical path lengths provides a way to multiplex optical signals in a plurality of channels on the time axis (time-division multiplexing). Optical time-division multiplexer modules can be classified into two types, a fiber-delay type and a spatial-coupling type, according to the method by which the path length differences are created.

In the fiber-delay type of multiplexer module, the input light (consisting of short pulses occurring at fixed intervals) is generally branched in an optical coupler or splitter, and the branched pulses are modulated (by on/off data modulation) in an electro-absorption modulator. The modulated light pulses are launched into optical fibers of different lengths. After passing through the optical fibers, the light pulses are combined in a device such as a three-decibel (3-dB) coupler to obtain an optical signal in which a plurality of channels are multiplexed on the time axis.

The spatial-coupling type of multiplexer module employs optical elements such as half mirrors, rather than optical couplers or splitters and optical fibers, to create a plurality of optical paths on which light travels for different distances through space within the module.

The fiber-delay type of multiplexer module has a simple construction, but the refractive index of the cores of its optical fibers varies slightly with ambient temperature, stress, and torsion, shifting the phase of the light that has passed through the optical fibers. Moreover, a certain length of fiber must be allowed for interconnections between optical fibers, and between optical fibers and electro-absorption modulators, so the optical fibers in this type of module cannot be extremely short. As a result, the cumulative phase shift due to refractive index variation in the fiber cores is fairly large. Therefore, it has not been possible to maintain the optimal phase relationship, necessary for long-distance optical transmission, among the light pulses exiting the optical fibers; specifically, it has not been possible to reverse the phase of the multiplexed pulse light at each successive pulse (i.e., to shift the phase of the output light by $\pi$ radians between successive pulses).

A spatial-coupling multiplexer module does not suffer from the problem of phase shift due to variation in the refractive index of the core of an optical fiber, but this type of multiplexer cannot compensate for changes in the wavelength of the input light. When the wavelength of the input light varies, the phase of the multiplexed output light also varies. Since the optical paths in a spatial-coupling multiplexer module are fixed, it has not been possible to change their lengths to compensate for these variations in the phase of the output light. A spatial-coupling multiplexer module employing waveguides (a planar lightwave circuit or PLC) has a similar disadvantage, and the further disadvantage of a large insertion loss.

SUMMARY OF THE INVENTION

An object of the present invention is to provide an optical multiplexer that overcomes the above problems: more specifically, one that enables long-distance optical transmission by enabling the phase of the multiplexed output light to be shifted by exactly $\pi$ radians at each pulse, and that can compensate for phase deviation in the output signal light due to changes in the wavelength of the input light.

The invented optical time-division multiplexer branches input light into a plurality of optical paths having different path lengths. At least one of the optical paths includes a section of optical fiber functioning as an optical path length adjustment section. Means are provided for altering the optical length of the optical fiber in the optical path length adjustment section. The input light propagating on each optical path is modulated by a signal to be transmitted, and the modulated light signals that have traversed the optical paths are combined into an output light signal.

By adjusting the optical length of the optical fiber in the optical path length adjustment section, the invented optical time division multiplexer can arrange for the phase of the multiplexed output light to be shifted by exactly $\pi$ radians at each successive pulse, and can compensate for deviations in this phase shift due to a change of the wavelength of the input light, thus making long-distance optical transmission possible.

DETAILED DESCRIPTION OF THE INVENTION

Embodiments of the invention will be described with reference to the attached drawings.

Figure 1:
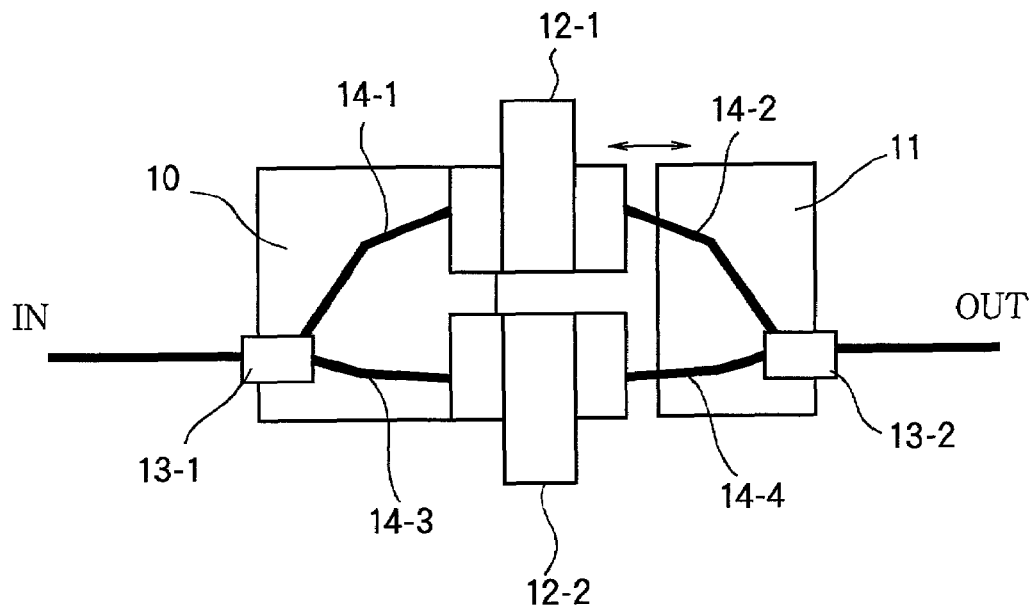
FIG. 1 shows the layout of an optical time-division multiplexer according to a first embodiment of the invention.

Referring to FIG. 1, the optical time-division multiplexer according to the first embodiment comprises a pair of substrates 10 and 11 for attachment of optical fibers, a pair of electro-absorption modulators 12-1 and 12-2, a pair of 3-db couplers 13-1 and 13-2, and optical fibers 14-1, 14-2, 14-3, and 14-4.

The length difference between the optical fibers 14-1 and 14-2, and likewise between the optical fibers 14-3 and 14-4, is set to an appropriate value according to the frequency of the optical pulses input to the 3-db coupler 13-1 and output from the 3-db coupler 13-2. For example, if the input optical pulse rate is ten gigahertz (10 GHz), and the multiplexed output optical pulse rate is 20 GHz, then the optical path length difference is set to approximately one centimeter (1 cm). The data to be transmitted (binary w signals, not shown) are supplied to the electro-absorption modulators 12-1 and 12-2, the extinction ratios of which vary according to the data values, so that the input optical pulses are modulated in an on/off manner.

A feature of the first embodiment is that the optical fibers disposed between the 3-db couplers 13-1 and 13-2 are fastened to the substrates 10 and 11 everywhere except in optical path length adjustment section. As shown in FIG. 1, the optical fibers 14-1, 14-3 on the input side are everywhere attached to the substrate 10, and the optical fibers 14-2 and 14-4 on the output side are attached to the other substrate 11 everywhere except in a short section between the substrate 11 and the electro-absorption modulators 12-1 and 12-2, where they are left free. The free sections of the optical fibers 14-2 and 14-4 are kept under tension between the substrate 11 and the electro-absorption modulators 12-1 and 12-2 by being pressed laterally, in a direction perpendicular to their length direction, by mechanical members not shown in the drawing. These free sections are used for optical path length adjustment.

In this arrangement, optical pulses entering the 3-db coupler 13-1 from the input side (IN) are split to create two signal channels, which are separately modulated in the electro-absorption modulators 12-1, 12-2. The two channels are combined in the 3-db coupler 13-2 to obtain an optical pulse signal having twice the bit rate of each channel, for transmission through an output fiber (OUT).

Since the optical fibers are fastened to the substrates at substantially all points, they do not expand or contract in length, and the phase of the multiplexed output light is highly stable. As noted above, long-distance transmission through an optical fiber requires a reversal of phase at each successive pulse of light propagating through the fiber; more specifically, the phase must shift by $\pi$ radians at each successive pulse. In this embodiment, if the wavelength of the input light is about one micrometer (1 µm), then the length of the free sections of the optical fibers 14-2 and 14-4 disposed between the substrate 11 and the electro-absorption modulators can be set to about one millimeter (1 mm). The force applied in these sections can be adjusted by any appropriate means so as to stretch the optical fibers by adjustable amounts, thereby slightly altering their optical length, while keeping them under tension. The phase difference between adjacent pulses (in this embodiment, the difference between the phase of the light output from optical fiber 14-2 and the phase of the light output from optical fiber 14-4) can thereby be set to precisely $\pi$ radians in an easy way.

As described above, in the first embodiment of the invention, substantially all parts of the optical fibers, except for short sections left free, are fastened to substrates in the fiber-delay time division multiplexer module, so that the phase of the output light is highly stable. Also, since it is possible to fine-tune the phase of the output light by altering the optical length of the free sections, the phase of the output light can be reversed at each successive pulse; more specifically, it can be shifted by exactly $\pi$ radians at each successive pulse, enabling long-distance optical transmission. This optical length adjustment can also be used to compensate for refractive index variations in the optical fiber cores, and for changes in the wavelength of the input light.

Figure 2:
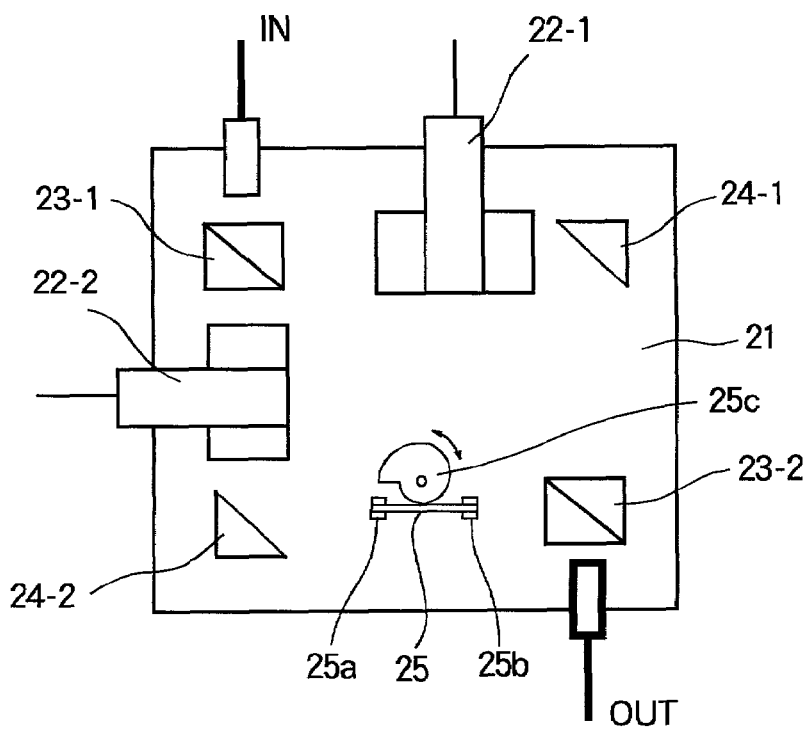
FIG. 2 shows the layout of an optical time-division multiplexer according to a second embodiment of the invention.

FIG. 2 shows the structure of an optical time division multiplexer according to the second embodiment of the invention. The structure in this drawing includes a substrate 21, electro-absorption modulators 22-1 and 22-2, half mirrors 23-1 and 23-2, mirrors 24-1 and 24-2, an optical fiber 25, optical fiber fasteners 25a and 25b, and an adjustable fiber bending member 25c.

A light pulse incident on half mirror 23-1 is branched into two pulses, one of which is modulated in electro-absorption modulator 22-1 and reflected by mirror 24-1, then exits to the outside through half mirror 23-2. The other branched pulse is modulated in electro-absorption modulator 22-2 and reflected by mirror 24-2, passes through the optical fiber 25 and is reflected by half mirror 23-2, then exits to the outside. Thus a multiplexed optical pulse signal with twice the bit rate of the signal supplied to each electro-absorption modulator 22-1, 22-2 can be obtained for transmission.

Since the refractive index of the optical fiber 25 (about 1.5) differs from that of the ambient space (about 1.0), the length of optical fiber 25 generates a difference in optical length between the two optical paths from half mirror 23-1 to half-mirror 23-2. The length of the optical fiber 25 should be set to a value that gives an appropriate optical path length difference, depending on the pulse frequency of the input light and that of the multiplexed output light.

The adjustable fiber bending member 25c is rotatably pivoted on a shaft perpendicular to the substrate surface, and has a varying radius; thus the distance from the shaft to the point touching the optical fiber 25 varies according to the rotational position of the adjustable fiber bending member 25c. Therefore, when the adjustable fiber bending member 25c is turned, the optical fiber 25 is deformed (bent) laterally and stretched, slightly altering its optical length.

If the wavelength of the input light varies, the difference between the phase of the light modulated in electro-absorption modulator 22-2, which passes through the optical fiber 25 and is reflected by half mirror 23-2 to the outside, and the phase of the light modulated in electro-absorption modulator 22-1, which passes through half mirror 23-2 to the outside, may deviate from its optimal value, i.e., $\pi$ radians, but the adjustable fiber bending member 25c can be rotated to alter the length of the optical fiber 25 slightly, to compensate for the deviation and restore the optimal value.

In the second embodiment, the required difference between the optical path lengths is obtained by the insertion of an optical fiber in one optical path, and the length of the optical fiber is altered slightly by the adjustable fiber bending member to compensate for any deviation from the optimal phase difference ($\pi$ radians) between adjacent pulses of the output light caused by a change in the wavelength of the input light. The use of an optical fiber to produce the optical path length difference also enables the second embodiment to obtain a given optical path length difference in less space than required by a conventional spatial-coupling time division multiplexer module, thereby reducing the size of the module.

The invention is not limited to the two embodiments described above. For example, to adjust the optical path length difference, the above embodiments use a member that applies mechanical force to deform an optical fiber, thus changing its length, but the adjustment may also be performed by utilizing thermal expansion of the optical fiber, or the slight variation of the refractive index associated with changes in temperature. Also, the above embodiments describe the multiplexing of two signals, but the invention can be used to multiplex three signals, four signals, or more.

Those skilled in the art will recognize that further variations are possible within the scope claimed below.

What is claimed is:

1. An optical time-division multiplexer that branches input light into a plurality of optical paths having different path lengths, modulates the input light propagating on each optical path by a signal to be transmitted, and combines the modulated light from the optical paths into an output light signal, wherein:

the optical time-division multiplexer comprises a substrate;

at least one of the optical paths includes a section of optical fiber functioning as an optical path length adjustment section;

both ends of the optical fiber comprising said optical path length adjustment section are fastened to the substrate;

said optical paths include spatial sections in which the branched input light propagates through a space having a refractive index different from a refractive index of the optical fiber;

the optical time-division multiplexer has means for altering the optical length of the optical fiber in the optical path length adjustment section; and said means for altering the optical length of the optical fiber comprises a member mounted on the substrate, rotatable in a plane parallel to the substrate, having a surface that presses against the optical fiber, bending the optical fiber by different amounts depending on the rotational position of the member.

2. A method of generating a time-division multiplexed optical signal by branching input light onto a plurality of optical paths, modulating the light separately on each optical path, and recombining the light from the optical paths, comprising the steps of:

providing a section of optical fiber on at least one of the optical paths; and adjusting an optical length of the optical fiber, thereby adjusting a phase relationship of the recombined light, by turning a rotatable member that presses against the optical fiber, thereby applying lateral pressure to the optical fiber to stretch the optical fiber, the rotatable member having a varying radius.

3. An optical time-division multiplexer comprising:

an input adapted to receive input light;

a half-mirror adapted to branch said input light onto a first spatial optical path and onto a second spatial optical path;

a modulator adapted to modulate said light on said first spatial optical path;

a mirror adapted to reflect said modulated light;

a section of optical fiber in said first optical spatial path adapted to receive said reflected light, said section of optical fiber being adapted to adjust a difference in optical path length between said first spatial optical path and said second spatial optical path; and a rotatable member that presses against said section of optical fiber, wherein rotation of said rotatable member generates a lateral pressure on said section of optical fiber.

4. The optical time-division multiplexer according to claim 3, wherein a refractive index of said section of optical fiber differs from a refractive index of ambient space.

5. The optical time-division multiplexer according to claim 3, wherein a length of said section of optical fiber corresponds to said difference in optical path length.

6. The optical time-division multiplexer according to claim 3, further comprising:

a second modulator adapted to modulate said light on said second spatial optical path;

a second mirror adapted to reflect said modulated light on said second spatial optical path;

a second half-mirror adapted to combine said reflected light on said first spatial optical path with said reflected light on said second spatial optical path; and an output adapted to output said combined light.

7. The optical time-division multiplexer according to claim 6, wherein said light branched onto said first spatial optical path has a first data rate and said light branched onto said second spatial optical path has a second data rate, and wherein a data rate of said combined light is twice said first data rate and said second data rate.

8. The optical time-division multiplexer according to claim 6, wherein said difference in optical path length relates to a pulse frequency of said input light and a pulse frequency of said combined light.

9. The optical time-division multiplexer according to claim 3, wherein a distance from said rotatable member to said section of optical fiber varies according to a rotational position of said rotatable member.

10. The optical time-division multiplexer according to claim 3, wherein rotating said rotatable member alters the optical phase of light propagating through said section of optical fiber.

* * * * *